Patented Sept. 4, 1928.

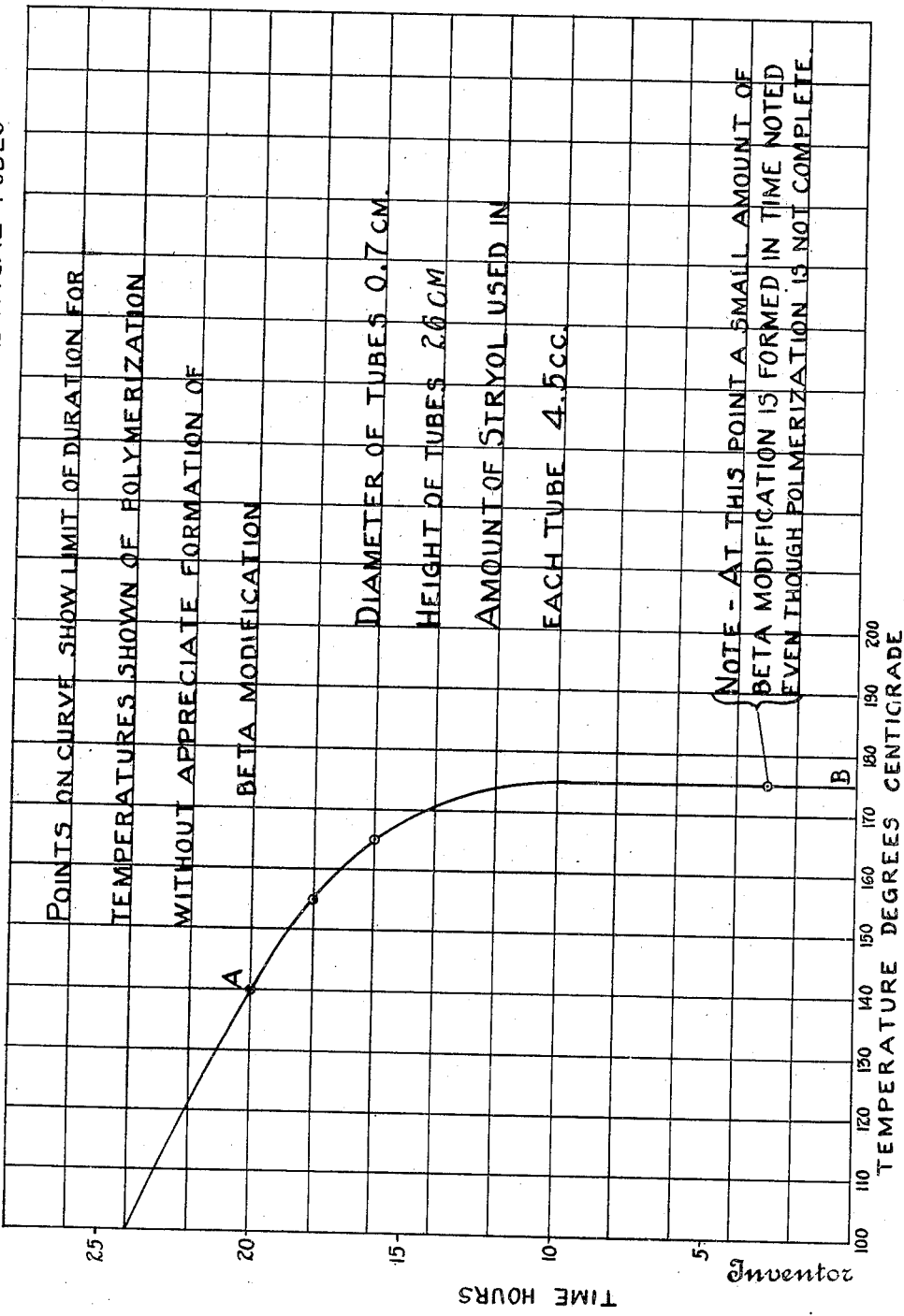

1,683,402

UNITED STATES PATENT OFFICE.

IWAN OSTROMISLENSKY, OF NEW YORK, N. Y., ASSIGNOR TO THE NAUGATUCK CHEMICAL COMPANY, OF NAUGATUCK, CONNECTICUT, A CORPORATION OF CONNECTICUT.

POLYMERIZED STYROL AND ITS HOMOLOGUES AND PROCESS FOR THE POLYMERIZATION OF STYROL AND ITS HOMOLOGUES.

Application filed July 12, 1924. Serial No. 725,658.

This invention relates to polymerized styrol and its homologues and to processes for the polymerization of styrol and its homologues.

The objects of the invention are to provide a series of products having considerable range of characteristics, and particularly products which are herein called alpha polymerized styrol or alpha polymerized $ArCH:CH_2$ where Ar is aryl, which while resembling such materials as celluloid and "Bakelite" shall differ from the former in its freedom from high combustibility and which shall differ from both celluloid and "Bakelite" in that it possesses a transparency equal approximately to that of ordinary mineral glass, being at the same time water-white and differing also from each of these substances in that it is moldable in final form, by which is meant that it may either be molded without the necessity of carrying out a chemical reaction at the same time as is necessary in the case of "Bakelite", or that it may be molded without subsequent evaporation of solvent as in the case of celluloid.

Another object of the invention is to provide simple, inexpensive processes for the polymerization of such materials.

This application is a continuation in part of application Sr. No. 648,803, filed June 30, 1923, and describes among others products which may result from the process described in my co-pending applications Serial Nos. 711,584 and 711,585, each filed May 7, 1924.

The application Serial No. 648,803, filed June 30, 1923, describes the polymerization of crude styrol, depolymerizing the solid product thus obtained, removing impurities, and repolymerizing the purified styrol recovered therefrom. This application also includes depolymerizing waste meta styrol for purposes of utilizing the styrol therein. The application Serial No. 711,584 is a continuation in part of Serial No. 648,803 and is concerned with the polymerization of an impure styrol to a brittle product, depolymerizing the brittle product, and separating the majority of non-styrol hydrocarbons, and repolymerizing the styrol portion to a tough transparent product. Application Serial No. 711,585 describes a method for obtaining a tough, transparent polymerized styrol from a styrol solution or mixture which contains at least 40% of unpolymerized styrol by polymerizing at 135–200° C. with access of air.

The invention accordingly comprises tough, transparent polymerized $ArCH:CH_2$ where Ar is aryl, including tough, transparent polymerized styrol, which I prefer to designate herein as alpha meta $ArCH:CH_2$ and alpha meta styrol respectively. It also includes substances which I designate as beta, gamma and complex meta styrol. The term "meta" as herein employed in the expression "alpha meta styrol" and the like is not intended to designate the position of a group but is intended to refer to the polymerized form of styrol. I have also described a group of substances as "complex" meta styrol as a means for designating another series of compounds whose properties differ from those of the alpha, beta and gamma meta styrols. The properties which distinguish these substances will be described in detail later in the specification. The invention also includes processes of polymerization of styrol and its homologues for the production of alpha $ArCH:CH_2$, and alpha, beta, gamma and complex meta styrol.

*Alpha meta styrol.*—The substance alpha meta styrol or tough, transparent polymerized styrol is described as an end product in each of the copending applications Serial Nos. 711,584 and 711,585 filed May 7, 1924, mentioned above. Each of these specifications describes a different method of handling the raw materials which ultimately result in alpha meta styrol. After obtaining styrol in a condition, as outlined by those specifications, in which polymerization will result in alpha meta styrol, certain conditions are mentioned for obtaining this desired product. There are other methods, however, which I have discovered which may be employed to accomplish the same end. Those methods are as follows:

*Example 1.*—Substantially pure styrol derived from any of the methods in the copending application 711,584 mentioned above and capable of producing a styrol of say 92% purity or above, or styrol derived from cinnamic acid or similar material is placed in a vertical sealed tube having a diameter of approximately 0.7 cm. and a height of approximately 26 cm. volume approximately 10.0 cc., the height of styrol in the tube being approximately 4.5 cm. and occupying roughly one-sixth of the volume of the tube. The lower portion of the tube, the tube being in approximately vertical position, is held in an air bath heated to approximately 140° C. for 20 hrs. at the end of which time polymerization is substantially complete and tough, transparent polymerized styrol or alpha meta styrol is obtained, the product being substantially free from unpolymerized styrol.

*Example 2.*—Styrol derived as indicated in Example 1 contained in a sealed tube having the dimensions given in Example 1 and placed in an air bath in the same way as given in that example heated to 155° C. for 18 hrs. is substantially completely polymerized to produce alpha meta styrol.

*Example 3.*—The conditions for the quantity of styrol mentioned and the position of the sealed tube are the same as given in the preceding examples, heating being maintained at approximately 165° C. for 16 hrs. at the end of which time polymerization is substantially complete and alpha meta styrol is produced.

*Example 4.*—The conditions for the quantity of styrol mentioned and the position of the sealed tube are the same, the air bath being heated to 175° C. for approximately 3 hrs., at the end of which time polymerization is substantially although not entirely complete. The polymerized mass in this example contains a small quantity of beta meta styrol and the temperature mentioned is approximately the upper limit for the formation of the alpha meta styrol without formation of appreciable quantities of the beta modification under the conditions mentioned.

The processes above have been represented graphically upon the drawing hereto attached forming part of the present specification and indicate the polymerization curve for the production of alpha meta styrol designated by the letters A—B. This curve as it appears represents the locus of points established as the maximum length of time of heating at the temperature given for the production of alpha meta styrol without the production of beta meta styrol in appreciable quantities.

Alpha meta styrol as produced by any of the above processes, as well as by the processes described in my copending applications Serial Nos. 711,584 and 711,585, filed May 7, 1924 mentioned above, is a substance which is tough and permanently transparent and may be practically colorless. It shows a dull fracture and may be cut with a knife to form thin films or parings. It has a high refractive index, namely 1.5–1.75. Its specific gravity is approximately 1.05; hardness determined on the hardness scale for minerals approximately 2–3; the piercing potential above 850 volts per mil. The product is substantially stable under the action of sunlight and weathering. It withstands relatively strong blows with a hammer. It is ground with great difficulty to a powder. As the completely polymerized mass cools the fresh product almost invariably breaks the glass vessel in which it is polymerized as it detaches itself from the sides of the vessel. It retains its shape substantially unaltered at approximately 100° C. It has a transverse tensile strength of 6000–7000 lbs. per square inch. In solution it does not decolorize a 3% solution of bromine at 0° C. It shows substantially no change under the prolonged action of hydrofluoric acid. On dry distillation at 375–475° C. it produces as high as 70% of its weight in styrol.

During polymerization to form alpha meta styrol as indicated a large number of bubbles may appear in the product, particularly where the area of the vertical section is about equal to or greater than the area of a cross section or horizontal section. During the cooling in a deep narrow container for example the upper layer and those which are adjacent the sides of the vessel are the first to grow cold and a hard crust of glass occurs. In consequence the reduction of volume proceeds from the inner portion which is still liquid forming vacuum bubbles. In order to obtain bubble-free alpha meta-styrol a vessel is selected whose capacity and shape is adapted to avoid the occurrence of bubbles. It has been found that every vessel can accommodate only a certain maximum amount of styrol if the polymerization is to result in a mass free from bubbles, for the contraction of the meta styrol upon cooling takes place primarily along the surface of the mass, and if this mass forms a meniscus with a sufficiently large surface, the resulting product will be entirely free from bubbles. Thus it is evident that large sheets of thin styrol glass may be manufactured directly by polymerizing the styrol in shallow vessels of a comparatively large area since the curve of the meniscus would be almost imperceptible. As a specific example a maximum amount of styrol for a round-bottom and cylinder-shaped tube with a diameter of 3.5 cm., approximately 75 cm. in length and having a volume of about 725 ccs. is about 106 grams or about 115 ccs. which rise to a height of about 12 cm. in the tube. If say 130 grams or approximately 140 cc. of styrol were placed therein bubbles would appear inside the reaction product. In the production of fairly long rods of bubble-free alpha meta styrol the original material is preferably polymerized in a tube of a slightly larger diameter than that desired in the finished product, the tube being placed horizontally. In this case the meniscus is distributed along the whole length of the tube. A rod having a cylindrical side and a flattened side is thus obtained and this can be shaped by a lathe or by a mold or a press to suitable form.

The alpha meta styrol, like other vitreous bodies, for example mineral glass, tends to set up stresses on cooling which in order to obtain its most valuable properties should be eliminated. Otherwise there is a likelihood of small cracks developing in various parts of the surface of the polymerized styrol which mars transparency and in some cases may result in fracture. In order to eliminate these the mass of polymerized styrol either in the form in which it is obtained from the polymerizing vessel or after subsequent molding or machining operations is heated for example in an oven at a temperature of about 100° C. for 3 to 24 hrs., the time depending on the shape, size and nature of the mass of polymerized styrol. This treatment will tend not only to remove local stresses owing to unevenness in cooling during previous operations but will also tend to remove stresses set up by the effects of unequal mechanical conditions and to remove small cracks, fissures or bubbles which may have appeared as a result of any or all of these conditions.

It will be observed that in the above examples in which the time of heating for any given temperature is stated, the other conditions are definitely established. If any of these for example the type of vessel, whether open or closed, the quantity of styrol or the shape and size of the vessel are altered the maximum length of time at which the styrol may be heated at a given temperature without the formation of appreciable amounts of the beta modification may be considerably different from that given in the examples. Apparently the shape and size of the vessel or the quantity of styrol have an effect only in so far as these factors alter the relative amount of the gas and liquid phases that is air or carbon dioxide, and styrol, as well as the area of contact of these two phases. For example, with a vertical vessel the conditions favor the formation of the alpha modification, while with a horizontal tube, they favor the formation of the beta modification, since in the latter case the area of contact of the gas and liquid phases is much greater than in the former. The duration of the process depends also on the refluxing of the original styrol during the polymerization. In a closed vessel the polymerization proceeds in the same manner as in an open vessel, if the former vessel is provided with a satisfactory reflux condenser. It should be noted, however, that the type of fracture resulting from the breaking of the polymerized product affords a valuable and definite criterion as to which modification has been produced, or in other words whether the heating has been prolonged beyond the point where only the alpha modification results. A dull or lusterless surface of the fracture characterizes the alpha meta styrol. A shiny lustrous surface characterizes the beta modification. If the heating has been prolonged so that in addition to the alpha, an appreciable amount of beta has resulted, the surface will be intermediate between the dull and the shiny, and may in fact be dull in spots and shiny in other places.

*Alpha $ArCH:CH_2$.*—Under this head are described tough, transparent poylmerized homologues of styrol which may be conveniently classified in this way. They include alpha meta ethyl styrol, alpha meta 2-methyl styrol, alpha meta 4-methyl styrol, alpha meta 2-4 dimethyl styrol.

These homologues are polymerized by heating under the conditions described above for the production of alpha meta styrol. The alpha modifications of the homologues detach themselves easily from the sides of the vessel in which they are polymerized. Upon dry distillation they produce the corresponding homologues of styrol. The polymerization of the homologues of styrol may be accelerated or retarded by the action of the same materials which accelerate or retard the polymerization of styrol itself, for example organic peroxides, calcium chloride, nitro compounds, and quinones. The modifications do not lose their transparency when kept in storage. 2-methyl styrol polymerizes more rapidly than does styrol itself and readily yields a soluble 2-methyl styrol modification; 2-4 dimethyl styrol and 4-methyl styrol on the contrary are transformed upon polymerization into insoluble modifications. These insoluble materials immediately after polymerization appear in the form of soft elastic substances which are altogether colorless and transparent. These substances stretch easily and change form at a temperature around 100° C. but when the pressure is removed immediately revert like rubber to the original form. They thus possess a high degree of elasticity. If the insoluble modification is heated with an excess of air to 100° C. for 10–20 hrs. or in vacuo at 120–200° C. for ½–3 hrs. and cooled the resulting substance is hard and resembles very much mineral glass. Upon heating the insoluble substance in vacuo at 200° C., it retains its original shape without change.

Alpha meta 2-4 dimethyl styrol retains its original form without appreciable change even when the temperature is changed to dark red heat. At normal pressure this substance does not melt. Upon dry distillation it gives off dimethyl styrol and tetramethyl distyrol. The surfaces of the homologues of alpha meta styrol display a wonderful lustre and have a highly polished appearance. When kept in storage for any length of time they do not lose their transparency and the lustre of the surface remains unchanged. The various alpha modifications have a relatively large coefficient of light dispersion.

Like alpha meta styrol the various substances designated as alpha meta ArCH:CH$_2$ have a surface which appears polished and displays a wonderful lustre. When kept in storage for any length of time they do not lose their transparency. They have a relatively large coefficient of light dispersion.

The soluble alpha modifications of polymerized homologues of styrol display the physical properties and constants of alpha meta styrol. Like this substance they easily dissolve in benzol and other aromatic hydrocarbons, in pyridine, chloroform, carbon disulphide, ether and carbon tetrachloride. They dissolve with difficulty with turpentine and are entirely insoluble in water, alcohol, acetone, paraffine oil and petroleum oil.

The alpha modifications of ArCH:CH$_2$ and alpha meta styrol as plastics are apparently more useful materials than the beta, gamma, and complex modifications. They lend themselves readily to molding and possess the advantages over plastics, celluloid and "Bakelite" recited among the objects of the invention as detailed above. Alpha meta styrol is a particularly useful substance being made from relatively inexpensive materials readily obtainable on the market. While it is as water white as glass and as transparent. it is not so brittle and therefore resists cracking to a greater extent. If cracking does occur the edges are not so sharp and hence not so apt to cut as in the case of glass thus making this material valuable where a material having such characteristics is needed.

Upon comparison of alpha meta styrol with its homologues mentioned above, such as alpha meta ethyl styrol, alpha meta 2-methyl styrol, alpha meta 4-methyl styrol, alpha meta 2-4 dimethyl styrol, it is found that they possess the following characteristics in common: They are tough and permanently transparent and may be practically colorless. They show a dull fracture and may be cut with a knife to form thin films or parings. They are stable and not particularly brittle, being much less brittle than mineral glass. They may not be easily ground to a powder.

*Beta meta styrol.*—In general beta meta styrol may be formed from styrol of substantially 92% purity. By exposing styrol in a quantity as given in the examples cited under the manufacture of alpha meta styrol employing the apparatus in the manner there indicated, the process is carried out with the temperatures and times in excess of those prescribed for the production of alpha meta styrol. The amount of beta meta styrol produced upon a slight excess of time or temperature will be relatively small for different points of the curve A—B and the amount produced will increase in accordance with the increase of the time and temperature for a given point on that curve.

*Example 1.*—A specific example of the production of beta meta styrol is as follows: Styrol of upwards of 92% purity is heated in a sealed glass tube about 3.5×75 cm. half filled with the material and placed in a horizontal position, the heating being continued for 40 hours in an air bath heated to 140° C. approximately, at the end of which time polymerization is substantially complete with the production of beta meta styrol. The tube may be a 3.5 by 75 cm. tube described above under alpha meta styrol. The smaller tube described in Example 1 under alpha meta styrol may be employed if desired. With the large tube whose volume is 725 cc. the amount of styrol is approximately 360 cc. With the smaller tube whose volume is 100 cc. the amount of styrol may be about 50 cc.

*Example 2.*—A sealed glass tube half filled with styrol of upward of 92% purity is heated for 18 hours in an air bath heated to 170° C. In a horizontal position at the end of which time polymerization is substantially complete with the production of beta meta styrol.

*Example 3.*—Under similar conditions styrol is heated for 12 hours in a bath heated to 180° C. at the end of which time polymerization is substantially complete with the production of beta meta styrol.

*Example 4.*—Under similar conditions styrol is heated for 22 hours in an air bath heated to 140° C. at the end of which time polymerization is substantially complete with the production of beta meta styrol.

*Example 5.*—Under similar conditions styrol is heated for 2½ hours in an air bath heated to 185° C. at the end of which time polymerization is substantially complete with the production of beta meta styrol.

If the styrol is heated for a shorter time than given in the examples above, it is apt to become a mixture of the alpha and beta modifications in which case the product shows in some places a lustrous and in others a mat or dull fracture.

As in the case of the alpha modification the speed at which the beta modification is formed depends not only on the temperature but on the amount of styrol as well as on the shape of the vessel in which the polymerization is carried out. I have often observed that when the sealed glass tube is placed in a horizontal position the polymerization of styrol to beta meta styrol takes place much faster than when the tube stands upright. For instance when the polymerization is conducted in a sealed glass tube placed in a vertical position at 180° C. beta meta styrol is formed in 75 hours while when under similar conditions the same tube is fixed horizontally, the reaction takes place in 12 hours.

Beta meta styrol is a transparent substance which may be substantially colorless. The transparency is usually lost on standing, at first in spots and finally the mass becomes dull and slightly translucent. The fracture of beta meta styrol is shiny and lustrous. It is not susceptible to cutting, sawing, planing, and polishing operations, cracking badly when subjected to these operations. When cut with a knife it splits into small grains, the surface of the cut being shiny and pitted. When hit with a hammer a relatively weak blow, or when dropped from a relatively inconsiderable height it cracks. It can be readily ground to a powder in a porcelain mortar. On cooling after complete polymerization it detaches itself from the sides of the glass vessel in which it was polymerized without breaking it. Heated to 100° C. it becomes appreciably more plastic and gradually loses its shape. The transverse tensile strength is 1000 lbs. per square inch. Upon dry distillation it produces approximately the same results as alpha meta styrol. When treated with bromine in the manner indicated for alpha meta styrol practically the same result is effected as with the alpha modification. Its reaction with prolonged treatment of hydrofluoric acid is the same as for alpha modification. This product contains substantially no unpolymerized styrol.

It should be noted that alpha meta styrol may be transformed to the beta meta styrol by heating the alpha in an open vessel at normal pressure. The length of the process depends upon the quantity and shape of the pieces of the original alpha meta styrol. In vacuo the transformation proceeds faster than it does under normal pressure.

*Gamma meta styrol.*—In general this modification is quickly and easily obtained by heating styrol in the presence of a sufficient amount of some organic peroxide. Barium peroxide, being an insoluble substance leads to the formation of the gamma modification of styrol at the bottom of the vessel, in those spots where it comes into direct contact with the styrol. As a specific example, 1 gram of benzoyl peroxide and/or 2 grams of triphenyl methyl peroxide, etc., are dissolved in 100 gms. of styrol and the resulting mixture is heated for 1–1½ hours at 175–180° C. In this space of time the styrol is entirely polymerized, being transformed to gamma-meta styrol. Gamma meta styrol is a transparent, brittle substance which in thick layers has yellowish color which displays a high coefficient of light dispersion. It does not become cloudy when kept for some time. Its fracture is shiny and lustrous. It may not be readily cut, sawed, planed or polished. When cut with a knife it splits even more readily than beta meta styrol. The surface of the cut is shiny and pitted. When struck with a hammer gamma metal styrol is less durable than beta metal styrol. It can be ground to a powder in a porcelain mortar with greater ease than beta meta styrol. Upon cooling after complete polymerization it detaches itself from the sides of the glass vessel in which it was polymerized without breaking it, but gives deep cracks inside the mass often splitting into several pieces. Upon being subjected to 100° C. it becomes increasingly more plastic and gradually loses its shape. It has a transverse tensile strength of 1000 lbs. per sq. inch. Its reaction toward bromine is the same as for the alpha meta styrol.

*Complex metal styrols.*—In heating meta styrol with various organic substances a new class of amorphous resinous products which in their outward appearance and properties are very similar to beta and gamma meta styrols, are obtained. They are designated herein by the name of those organic substances which enter into their molecule with styrol. For instance the resinous product which is obtained in the heating of a mixture of styrol and ethyl benzol is herein called ethyl benzol-meta styrol. Similarly naphthalene-meta styrol represents a resinous product formed by heating naphthalene with styrol.

The following are examples for the production of various types of complex meta styrols:

*Example 1.*—A solution of 3 grams of ethyl benzol and 50 grams of styrol is heated at 180° C. for 10–40 hours in a sealed tube. After this the unchanged styrol and ethyl benzol are distilled in vacuo, the temperature being raised towards the end of the process to 180° C. Distillation is continued until a constant weight of the resinous residue in the flask is attained. As a result ethyl benzol-meta styrol is obtained having the properties described below.

The entrance of ethyl benzol into the molecule depends on the temperature at which polymerization takes place. The ethyl benzol-meta styrol produced in accordance with the above example is substantially identical with the resinous material obtained in copending application Serial No. 711,584 and referred to as "resinous polymerized styrol." The production or absence of production of ethyl benzol-meta styrol may be controlled for example as set forth in detail in copending application Serial No. 711,585, filed May 7, 1924.

Ethyl benzol-meta styrol is a substance which loses its transparency in ageing and becomes opaque and white, unless entirely freed by long heating to constant weight from unchanged ethyl benzol. Its surface of fracture is shiny and lustrous. If an attempt is made to cut it, saw it, plane it, or polish it, it splits or gives deep cracks. When cut it usually crumbles. It is less durable than either the beta or gamma modifications. It is easily reduced to a fine powder by simply rubbing it between the fingers. It detaches itself from the side of a glass vessel in which it is polymerized without breaking it, but gives deep cracks inside the mass, often splitting into several pieces. It becomes plastic even at 60° C. Upon dry distillation carried out according to the dry distillation of alpha meta styrol elsewhere cited, it produces styrol with a maximum yield of 40–50%. Treated with a 3% solution of bromine at 0° C. it decolorizes even a negligible amount of bromine. Under the prolonged action of hydrofluoric acid it becomes cloudy and loses its transparency.

*Example 2.*—A solution of 50 gms. of pure styrol in 50 gms. of 95% alcohol is heated in a sealed tube for 24 hours at 170° C. The original mixture begins to cloud almost immediately and separates into two layers, the upper mobile layer containing alcohol in which the residue of unchanged styrol is dissolved. After the reaction is completed the upper layer is poured off and the remaining liquid washed several times in alcohol and then heated in vacuo to a constant weight. The ethyl alcohol-metastyrol obtained in this reaction is a colorless vitreous but very brittle mass.

*Examples 3 and 4.*—A solution of 2 grams of camphor or else 2 grams of naphthalene in 100 grams of pure styrol is heated in a vessel with a reflux condenser for 24 hours at 170° C. In the end complex camphor metastyrol or naphthalene-metastyrol is obtained. Both products are distinguished by their relatively great elasticity, a considerable softness and a peculiar property of adhering tenaciously, as if glued, to the sides of the vessel in which they were polymerized.

Complex meta styrol may be formed by entrance into the meta styrol molecule of the following substances: benzol, toluol, xylol, ethyl benzol, mixtures of these hydrocarbons, distyrol, naphthalene, paraffine, ethyl alcohol, camphor, acetophenon, aniline, trinitro-benzol, picric acid, cresol, phenol, acetic, stearic, palmitic, cinnamic and salicylic acids.

Alpha metal styrol and its homologues may be colored as desired by the addition of various coloring materials such as dyes and pigments.

As many apparently widely different embodiments of this invention may be made without departing from the spirit thereof, it is to be understood that I do not intend to limit myself to the specific form of the invention as set forth except as indicated in the appended claims.

Having thus described my invention what I claim and desire to protect by Letters Patent is:

1. A process for forming alpha meta styrols which comprises heating styrols of approximately 92% purity or greater between approximately 140° C. and approximately 175° C. for 20 to 3 hours, maintaining time-temperature relations in accordance with the curve which is approximately defined by the time versus temperature values 20 hours—140° C., 18 hours—155° C., 16 hours—165° C., 10 hours—175° C., 5 hours—175° C.

2. A process for forming bubble-free alpha meta styrol which comprises polymerizing a mass of styrol whose vertical dimension is not greater than approximately 6.5 times its cross-sectional dimension.

3. A process for forming bubble-free alpha meta styrol which comprises placing a quantity of styrol, of approximately 92% purity or above, in a sealed vessel held substantially vertically, and being approximately one-sixth filled with styrol, and maintaining the material in an air bath heated to approximately 140° C. for 20 hours.

4. As new compounds alpha meta styrols, materials which are tough and permanently transparent, showing a dull fracture, and withstanding relatively strong blows without shattering, said materials being substantially free of unpolymerized styrols.

5. In a process of producing tough, transparent polymerized meta styrol, the step of eliminating fissures and stresses in a polymerized mass of said meta styrol by heating the mass at approximately 100° C. for approximately 3 to 24 hrs.

Signed at New York, county and State of New York, this 10 day of July, 1924.

IWAN OSTROMISLENSKY.